US006826232B2

(12) United States Patent
Chen et al.

(10) Patent No.: US 6,826,232 B2
(45) Date of Patent: *Nov. 30, 2004

(54) FINE GRANULAR SCALABLE VIDEO WITH EMBEDDED DCT CODING OF THE ENHANCEMENT LAYER

(75) Inventors: Yingwei Chen, Ossining, NY (US); Hayder Radha, Mahwah, NJ (US); Mihaela Van Der Schaar, Ossining, NY (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 401 days.

(21) Appl. No.: 09/467,589

(22) Filed: Dec. 20, 1999

(65) Prior Publication Data

US 2003/0133499 A1 Jul. 17, 2003

(51) Int. Cl.⁷ .................................................. H04N 7/18
(52) U.S. Cl. .............................. 375/240.18; 375/240.11
(58) Field of Search ........................ 375/240.1–240.11, 375/240.18

(56) References Cited

U.S. PATENT DOCUMENTS

| | | | |
|---|---|---|---|
| 4,710,790 A | 12/1987 | Okamoto et al. | 357/23.6 |
| 5,339,108 A | 8/1994 | Coleman et al. | 348/408 |
| 5,371,024 A | 12/1994 | Hieda et al. | 437/40 |
| 5,528,299 A | 6/1996 | Dufour et al. | 348/412 |
| 6,134,269 A * | 10/2000 | Puri et al. | 375/240.03 |
| 6,256,346 B1 * | 7/2001 | Yamaguchi et al. | 375/240.12 |
| 6,263,022 B1 * | 7/2001 | Chen et al. | 375/240.03 |
| 6,275,531 B1 * | 8/2001 | Li | 370/468 |

FOREIGN PATENT DOCUMENTS

| | | | |
|---|---|---|---|
| EP | 0454927 A2 | 11/1991 | H04N/7/13 |
| EP | 0551672 A2 | 7/1993 | H04N/7/13 |
| JP | 000096753 | 11/1988 | |
| JP | 08088283 | 4/1996 | |
| WO | 9853613 | 4/1998 | |
| WO | WO9837700 | 8/1998 | H04N/7/30 |
| WO | WO9916250 | 4/1999 | H04N/7/30 |

OTHER PUBLICATIONS

Van Der Schaar M. et al, "Embedded DCT and Wavelet Methods for Fine Granular Scalable Videeo: Ananlysis and Comparison", Jan. 2000, (Abstract).

"Zerotree Coding of DCT Coefficients", D.M. Monro and G.J. Dickson, School of Electronic and Electrical Engineering, University of Bath, England, ICIP 97, pp. 1–4.

* cited by examiner

Primary Examiner—Andy Rao
(74) Attorney, Agent, or Firm—Russell Gross

(57) ABSTRACT

The present invention is directed to a method for encoding video data in an embedded fashion in order to achieve fine granular scalable video. The method includes the video data being transformed into a plurality of DCT coefficients. Further, the DCT coefficients are arranged into sub-groups and the DCT coefficients are scanned according to the sub-groups. The DCT coefficients being scanned by the sub-groups enables a higher level of scalability to be achieved.

8 Claims, 2 Drawing Sheets

```
FOR EACH BIT-PLANE BP               ~74
    DO
        FOR EACH SUB-GROUP SG       ~76
            DO
                FOR EACH BLOCK B    ~78
                    DO
                        FOR EACH COEFFICIENT IN SUB-GROUP SG  ~80
                        DO
                            PROCESS BIT-PLANE BP OF THIS
                            COEFFICIENT IN SUB-GROUP SB
                            OF BLOCK B
                    DONE
                DONE
            DONE
    DONE
```

FIG. 3

FINE GRANULAR SCALABLE VIDEO WITH EMBEDDED DCT CODING OF THE ENHANCEMENT LAYER

BACKGROUND OF THE INVENTION

The present invention generally relates to video compression, and more particularly to a method for encoding enhancement layer video data in an embedded fashion in order to achieve fine granular scalable video.

Scalable video coding is a desirable feature for many multimedia applications and services that are used in systems employing decoders with a wide range of processing power. Several types of video scalability schemes have been proposed such as temporal, spatial and quality scalability. All of these types consist of a base layer and an enhancement layer. The base layer is the minimum amount of data required to decode the video stream, while the enhancement layer is the additional data required to provide an enhanced video signal.

For each type of video scalability scheme, a particular scalability structure is defined. One type of structure is known as fine granularity scalability (FGS), which has been proposed and will soon become part of the MPEG-4 multimedia standard. The use of FGS primarily targets applications where video is streamed over heterogeneous networks in real time. Further, FGS enables the bandwidth to be adapted by encoding content once for a range of different bit rates, which enables a video transmission server to change the transmission rate dynamically without in depth knowledge of or parsing the video stream.

Currently, there is an implementation of the proposed FGS structure in MPEG-4 as a reference for the core experiment on this standardization activity. This particular implementation uses the current MPEG-4 coding standard as the base layer encoding scheme. The MPEG-4 implementation also encodes the enhancement layer as the difference between the discrete cosine transform (DCT) coefficients of the original picture and the reconstructed base layer DCT coefficients. Further, the enhancement coding scans through the difference (or residual) DCT coefficients bit-plane by bit-plane to encode a series of 1's and 0's as a refinement of the base layer DCT coefficients.

One major limitation of the above-described implementation is that the enhancement layer encoder scans each individual bit plane of the residual DCT coefficients from the most significant to the least significant bit, block by block. In other words, for each bit plane, a whole DCT coefficient block is scanned before subsequent blocks are scanned. Thus, this requires coding of one bit-plane of all of the DCT coefficients for the whole image in order to refine the entire picture. Therefore, the enhancement layer bit stream generated by this implementation contains only a limited number of scalability layers.

Embedded or progressive coding of still images was first utilized for wavelet image coding, which was later extended to DCT image coding. Thus, embedded DCT coding algorithms have been proposed in the past. These coding algorithms retained high compression efficiency while achieving high scalability in the resulting bit streams. Therefore, these algorithms may be alternatives for the FGS encoding structure.

SUMMARY OF THE INVENTION

The present invention is directed to a method for encoding video data in an embedded fashion in order to achieve fine granular scalable video. The method according to the present invention still scans the DCT coefficients bit-plane by bit-plane. However, the present invention differs in that it incorporates DCT frequency domain scanning besides spatial and bit-plane scanning.

The method according to the present invention includes the video data being transformed into a plurality of DCT coefficients. Further, the DCT coefficients are arranged into sub-groups and the DCT coefficients are scanned according to the sub-groups. The DCT coefficients being scanned by the sub-groups enables a higher level of scalability to be achieved.

BRIEF DESCRIPTION OF THE DRAWINGS

Referring now to the drawings were like reference numbers represent corresponding parts throughout:

FIG. 3 is a diagram showing one example of the DCT coefficient scanning according to the present invention.

DETAILED DESCRIPTION

Figures 1, 2:
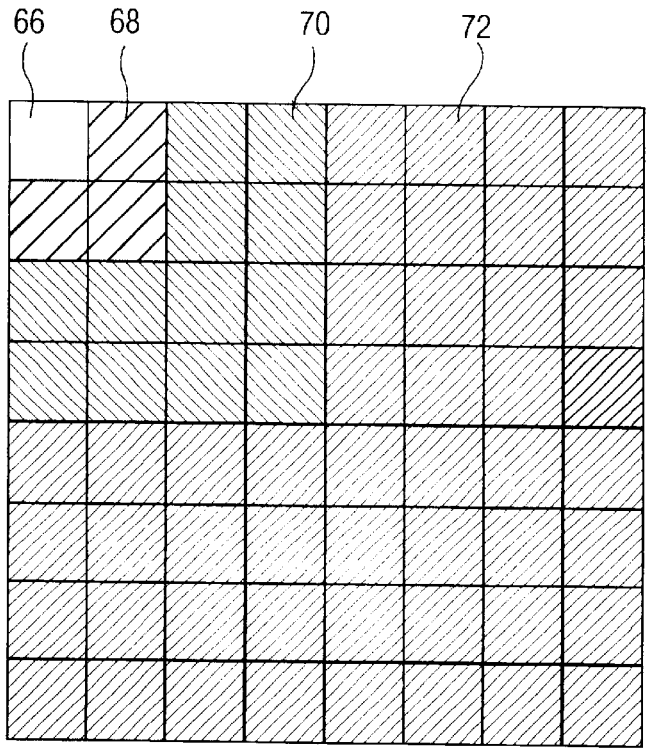
FIG. 1 is a diagram showing one example of the sub-grouping of the DCT coefficients according to the present invention.
FIG. 2 is a diagram of the pseudo code for the DCT coefficient scanning according to the present invention.

The present invention is directed to a method of encoding enhancement layer video data in order to achieve fine granular scalable video. This is accomplished by scanning enhancement layer DCT coefficients in an embedded fashion. The method according to the present invention still scans the DCT coefficients bit-plane by bit-plane. However, the present invention differs in that it incorporates DCT frequency domain scanning besides spatial and bit-plane scanning.

As previously described, the enhancement layer encoder proposed for MPEG-4 scans the DCT coefficients block by block for each bit-plane. This means that every DCT coefficient in a block is scanned before proceeding to the next block of coefficients. In contrast, the present invention scans a subset of the DCT coefficients included in each of the blocks before proceeding to the next block for each bit-plane. In other words, for each bit-plane, the DCT coefficient blocks are scanned a portion at a time. Thus, when the present invention finishes scanning one sub-group for all of the DCT coefficient blocks included in a bit-plane, it will then scan the next sub-group of DCT coefficients in the same bit plane. The DCT coefficients being scanned by the sub-groups enables a higher level of scalability to be achieved.

It is preferred that method of scanning the DCT coefficients according to the present invention is performed in two steps. These two steps include arranging the DCT coefficients of each bit plane into sub-groups and then scanning each bit-plane according to these sub-groups. However, prior to this scanning, other processing is also performed that is also common to the enhancement layer encoder proposed for MPEG-4. This processing includes generating the enhancement layer DCT coefficients from the video data. Further, the enhancement layer DCT coefficients are digitized and then divided into bit-planes.

In the first step of the method according to the present invention, the DCT coefficients of each bit plane are arranged into sub-groups. Since each bit-plane includes a number of DCT coefficient blocks, the first step produces DCT coefficient blocks having a similar sub-group arrangement. In one example, the DCT coefficients are arranged into four sub-groups having a pyramid-like structure that resembles the wavelet transform, as shown in FIG. 1.

As can be seen from FIG. 1, each of the sub-groups 66,68,70,72 is shaped in an L-configuration and is characterized by a distinctive gray level. Further, it is also evident that the first sub-group 66 includes just the DC coefficient, the second sub-group 68 includes the three neighboring DCT coefficients, the third sub-group 70 includes the next twelve coefficients, etc.

It should be noted that the arrangement of the DCT coefficients shown in FIG. 1 represents only one example. According to the present invention, other arrangements are contemplated. For example, the first and second sub-groups 66,68 can be combined into a one sub-group. Further, the configuration of the sub-groups can be changed. Instead of the L-configuration of FIG. 1, a square or rectangular configuration can also be utilized.

In the second step of the method according to the present invention, the DCT coefficients of each bit plane are scanned according to the sub-groups provided by the first step. It should be noted that the term "scanning" refers to the order in which the DCT coefficients are encoded. As can be seen from FIG. 2, the scanning according to the present invention is performed at four levels.

The first level of scanning occurs at the bit-plane level 74. This means that one bit-plane of the all of the DCT coefficients are encoded before the next bit-plane. The second level of scanning occurs at the sub-group level 76. This means that one sub-group is completely encoded before the next sub-group is encoded in each of the bit planes.

The third level of scanning occurs at the block level 78. This refers to the order in which the DCT coefficient blocks are encoded. As previously described, the DCT coefficient blocks included in each bit-plane will be arranged into similar sub-groups. Thus, scanning at the block level 78 refers to the order in which the same sub-group of DCT coefficients from each of the blocks is encoded. In some situations, it may be preferable to encode the sub-groups from each block in spatial order. The fourth level of scanning is at the coefficient level 80. This refers to the order in which the individual coefficients from each block are encoded.

Figure 3:
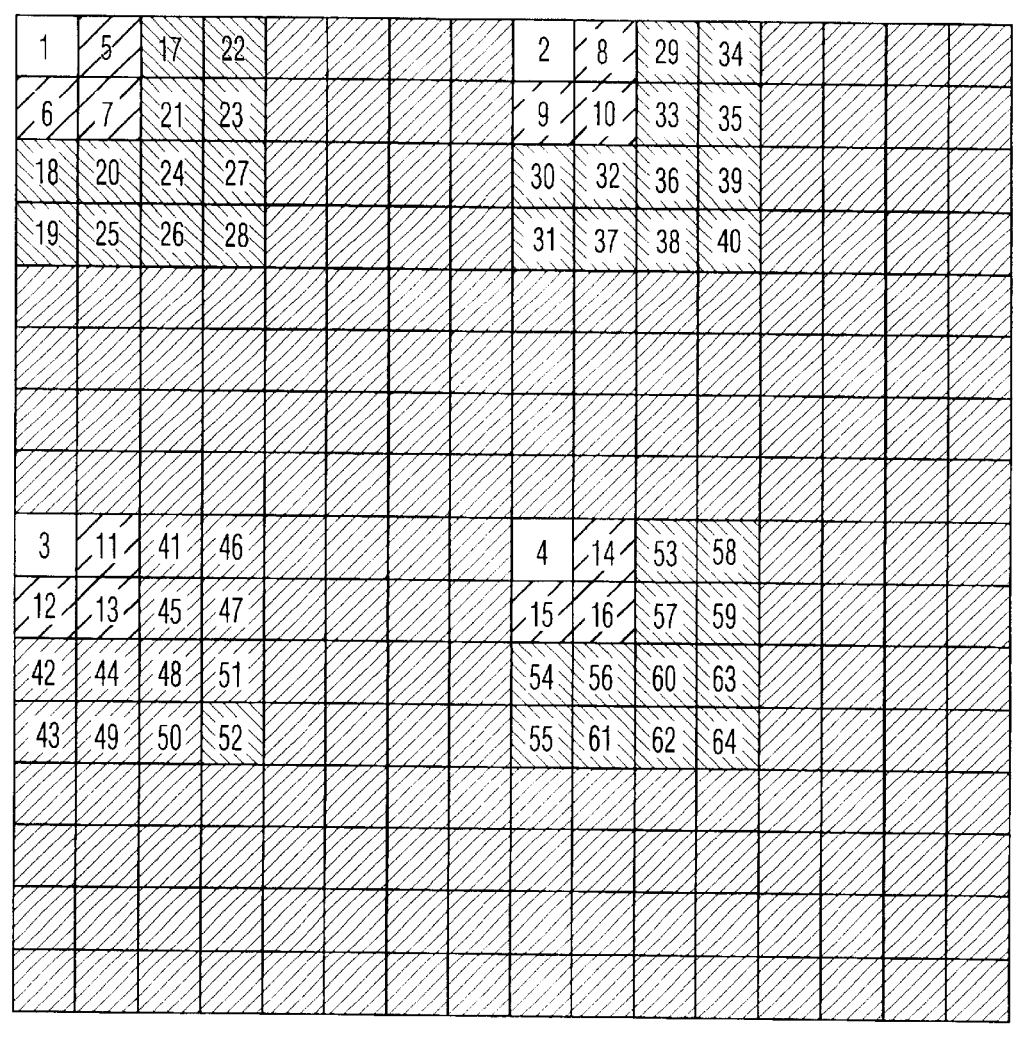

An example of the DCT coefficient scanning (second step) according to the present invention is shown in FIG. 3. In order to simplify illustration, only four DCT coefficient blocks of a bit-plane is shown and only scanning of the first three sub-groups is shown. Further, the numbers included in the DCT coefficient blocks indicate the order in which the coefficients are encoded. As can be seen, all of the scanning occurs within the same bit-plane, which implies scanning at the bit-plane level 74. Further, one sub-group is completely scanned before the next sub-group, which implies scanning at the sub-group level 76.

As can be further seen from FIG. 3, the scanning at the block level 78 occurs in spatial order. However, the present invention contemplates other orders. For example, if an image is at the center of a picture, it would be preferable to start scanning with a DCT coefficient block corresponding to the center of the picture. As is further evident, scanning at the coefficient level 80 in the second sub-group of coefficients occurs from top to bottom and left to right. Also, scanning at the coefficient level 80 in the third sub-group of coefficients occurs in a diagonal pattern, as shown. This demonstrates that the present invention contemplates scanning at the coefficient level 80 in a number of predetermined patterns.

The foregoing description of the present invention have been presented for the purposes of illustration and description. It is not intended to limit the invention to the precise forms disclosed. Many modifications and variations are possible in light of the above teachings. Therefore, it is not intended that the scope of the invention should be limited by the detail description.

What is claimed is:

1. A method for scanning discrete cosine transform (DCT) coefficients, the method comprising the steps of:

dividing the DCT coefficients into bit-planes;

arranging the DCT coefficients of each of the bit-planes into sub-groups; and scanning the DCT coefficients of each of the bit-planes according to the sub groups.

2. The method of claim 1, wherein each of the sub-groups has an L-configuration.

3. The method of claim 1, wherein each of the sub-groups is scanned in a spatial order.

4. The method of claim 1, wherein the DCT coefficients are enhancement layer DCT coefficients.

5. A method for encoding video data, the method comprising the steps of:

transforming the video data into a plurality of DCT coefficients;

dividing the DCT coefficients into bit-planes;

arranging the DCT coefficients of each of the bit-planes into sub-groups; and scanning the DCT coefficients of each of the bit-planes according to the sub-groups.

6. The method of claim 5, wherein each of the sub-groups has an L-configuration.

7. The method of claim 5, wherein each of the sub-groups is scanned in a spatial order.

8. The method of claim 5, wherein the video data is enhancement layer video data.

* * * * *